(12) United States Patent
Ray

(10) Patent No.: US 8,338,785 B2
(45) Date of Patent: Dec. 25, 2012

(54) APPARATUS AND METHOD FOR DETECTING AIRCRAFT ICING CONDITIONS

(75) Inventor: Mark D. Ray, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 13 days.

(21) Appl. No.: 13/098,050

(22) Filed: Apr. 29, 2011

(65) Prior Publication Data

US 2012/0274938 A1    Nov. 1, 2012

(51) Int. Cl.
*G01J 5/00* (2006.01)
(52) U.S. Cl. .................................. 250/338.1
(58) Field of Classification Search .... 250/338.1–338.5, 250/340, 339.01–339.15, 341.1–341.8
See application file for complete search history.

(56) References Cited

U.S. PATENT DOCUMENTS

| | | | |
|---|---|---|---|
| 3,940,622 A * | 2/1976 | Stallabrass et al. | 250/338.1 |
| 2005/0189493 A1 * | 9/2005 | Bagley et al. | 250/341.8 |

OTHER PUBLICATIONS

Karev et al., "Measuring temperature of the ice surface during its formation by using infrared instrumentation," 2007, International Journal of Heat and Mass Transfer, vol. 50, pp. 566-579.*
Peng et al., "Supre-Cooled Large Droplets consideration in the droplet impingement simulation for aircraft icing," 2011, Procedia Engineering, vol. 17, pp. 151-159.*

* cited by examiner

*Primary Examiner* — Kiho Kim
(74) *Attorney, Agent, or Firm* — Edwards Wildman Palmer LLP; Scott D. Wofsy; Joshua L. Jones

(57) ABSTRACT

An apparatus for detecting icing conditions on an aircraft includes a laser system configured to direct a light signal into a cloud, a lens component configured to collect echo signals from a cloud caused by the light signal directed into the cloud, a beam splitter component configured to redirect signals received and passing through the lens component into at least first and second paths and a supercooled large droplet (SLD) detector to receive the redirected signals. The SLD includes a first signal detector component configured to perform a first color measurement on the first redirected signal, and a second signal detector component configured to perform a second color measurement on the second redirected signal. The SLD detector is configured to use the first and second color measurements to determine liquid water content and droplet diameter distribution for the cloud.

17 Claims, 7 Drawing Sheets

APPARATUS AND METHOD FOR DETECTING AIRCRAFT ICING CONDITIONS

FIELD OF THE INVENTION

The present invention concerns in-flight sensors on board aircraft for detecting airborne liquid water droplets and ice crystals.

BACKGROUND OF THE INVENTION

The detection of airborne water droplets and their classification according to droplet size is an important function of an in-flight icing conditions detector. Current ice protection devices on aircraft, such as inflatable boots, are well-suited for ice accumulation from small droplets (e.g. <40 μm mean value diameter) but may not provide protection from ice accumulation when the impinging droplets are large. In particular, the ability to discriminate supercooled large droplets (SLD) is quickly becoming recognized as a critical safety feature for an icing conditions sensor. SLD are typically greater than 40 μm diameter and are well below the freezing temperature of water. When they strike the leading edge of an airplane wing, they tend to roll beyond the leading end and freeze in locations inaccessible to anti-icing devices but critical to the control of the aircraft. Supercooled large droplets are believed to have caused some aircraft accidents, such as the fatal crash of an ATR-72 in Roselawn, Ind. in 1994.

Soft targets with a high density of scattering sites (such as clouds) will produce multiple scattering when they are probed by a laser beam. For multiple scattering, light rays experience two or more scattering events before returning to the lidar receiver. Most analyses of lidar multiple scattering assume that each detected ray experiences numerous small-angle forward scatterings (both while propagating away from and towards the lidar) and one single large-angle (~180°) scattering event that is responsible for its backscatter towards the lidar receiver. The small-angle forward scatterings are due primarily to diffraction of the light around the particles, and these small angles are largely responsible for the increased field-of-view of the received light as the laser beam penetrates the soft target. In the process of multiple scattering, the rays diffuse laterally, and the received field-of-view will expand beyond the laser divergence, depending on the size distribution and density of the scattering particles that comprise the soft target.

The general relationship between the particle diameter (d), the laser wavelength (λ), and the forward-scattering diffraction angle (β) is:

$$\beta \propto (\lambda/d)$$

This is a simple proportional relationship between droplet diameter and scattering angle. Within a cloud, however, there is a distribution of water droplet sizes, and the scattering angles will vary according to this distribution. Generally speaking, however, small particles produce large scattering angles, and vice versa.

FIG. 1 presents a simplified view of the field-of-view as a lidar beam penetrates distance x into a cloud 50 located a distance R from the receiver 52. If the scattering angle is β, then the field-of-view θ can be obtained from:

$$\tan(\theta) = x\tan(\beta)/(R+x) \approx x\lambda/(R+x)d, \text{ in the limit of small } \theta \text{ and } \beta$$

For the case that R=1000 m, x=200 m, λ=1 μm, and d=5 μm (typical of a water cloud), the field of view θ is approximately 40 mrad, which corresponds to the maximum field-of-view employed by prior art multiple field of view lidar systems. However, for supercooled large droplets, droplet sizes range from 50 μm to over 100 μm. In a cloud of 40 μm droplets, the field-of-view decreases to 5 mrad; for 100 μm and larger, it is less than 2 mrad. The inverse relationship of field-of-view with droplet size means that the multiple fields-of-view generated by large droplets crowd close together near the single-scattering field-of-view generated naturally by the divergence of the laser beam.

FIG. 2 shows how the multiple fields-of-view generated by droplets reflecting backscattered light appears at the focal plane. An outgoing collimated light beam 54 illuminates the droplets and the backscattered light 56 from the droplets passes through one or more receiver lenses 58 after which it is received by in a detector region, generally shown as 60, arranged along the optical axis A. At the upper half of the detector's focal plane 62, multiple fields of view map into concentric rings, generally shown as 64.

The concept behind a multiple field-of-view (MFOV) detector is to place multiple detector elements into the focal plane of the receiver optic and simultaneously measure the backscatter from the various fields of view. In the focal plane, the various FOVs occupy different spatial locations, with the distance from the optical axis (y) being proportional to the FOV according to the relation:

$$y = f\theta$$

where f is the focal length of the receiver optic. For a lidar with a 2″ diameter, f/2.5 receiver lens, the displacement is 63 μm for every 0.5 mrad angle with regard to the optical axis of the lidar.

U.S. Pat. No. 5,239,352 (Bissonnette) discloses a prior art receiver for detecting MFOV lidar backscatter. FIGS. 3 and 4 show that this prior art receiver 71 has a multi-element radiation detector 73 located in the focal plane "f" of the receiving optics 72 having optical axis 74. The detector 73 consists of a number of concentric circular silicon detector elements (PIN photodiodes) 73-1, 73-2, 73-3 and 73-4. As a result of the four separate detector elements, the receiver 71 can differentiate received backscattered radiation signals between several fields of view. A backscattered signal received for any field of view larger than the divergence of the lidar's laser beam is due to multiple scattering.

The bandwidth of the detector elements is sufficiently high to ensure range resolution of <5 meters as the beam penetrates the cloud. In this detector, each detector element integrates the signal over a given range of field-of-view and generates a single value. The four concentric detector elements cover the following fields-of-view:

73-1 0-3.75 mrad
73-2 3.75-12.5 mrad
73-3 12.5-25.0 mrad
73-4 25.0-37.5 mrad

Detector element 73-1 measures the entire single scattering signal with some multiple scattering as well; detector elements 73-2 through 73-4 measure only the multiple scattering. However, for the detection of supercooled large droplets, the fixed FOV at 3.75 mrad might be a limitation since most of the useful scattering information may be completely contained within this single FOV, which also contains the entire single scattering signal. Thus, there is no way to distinguish multiple scattering due to large droplets from that due to single scattering. In addition, the FOVs are fixed and cannot be reconfigured.

U.S. Pat. No. 4,893,003 (Hays) discloses a circle-to-line interferometer optical system (CLIO) for use with a Fabry- Perot interferometer. As seen in FIGS. 5-6, a CLIO system includes a conical reflector segment 80 that is provided with an interior conical reflective surface 81. The conical reflective surface 81 is oriented so as to reflect incoming parallel light rays 83 produced by a Fabry-Perot Interferometer and containing circular fringe information 82. The light rays 83 propagate in a direction substantially parallel to a conical axis 84 of the conical reflector segment 80. The circular fringe information 82 is converted into linear information when the reflected light rays 83 are received by a conventional linear array detector 87, such as a charge coupled device of the sort used in spectroscopic analysis. The radii of the interferometer fringes depend on the spacing of the interferometer's reflective surfaces, the speed of the particles that reflect light into the spectrometer, the wavelength of the light, and on the phase coherence of the light entering the interferometer. The apex of the cone may be situated where the conical axis 84 intersects the focal plane of the circular fringe pattern 82. The azimuthal angle of the detected circular fringe pattern 82 may be reduced with the use of a tele-kaleidoscope 86 (FIG. 6) comprising a predetermined arrangement of mirrors 85. A right-angle cone with a reflective surface 81 reflects the circular fringe information into a line in the plane P on which the detector 87 is located. As seen in FIG. 7, the incoming angle $\theta_i$ is reflected onto the plane P at the reflection angle $\theta_r$, thereby producing a one-to-one mapping with information at radius y of the circle entering the cone being detected at a distance x from the cone apex V. Thus, incoming circular fringe information comprising alternating bright and dark regions are detected as alternating bright and dark regions along the linear array detector 87.

In addition to detecting the presence and size of water droplets, it is desirable to distinguish the cloud phase (water vs. ice) because some engine flameout incidents have been attributed to ingestion of airborne ice crystals by aircraft engines. US Patent Application No. 2010/0110431 to Ray describes a device for optically detecting and distinguishing airborne liquid water droplets and ice crystals includes an illumination portion and a detection portion. The illumination portion outputs a circularly polarized illuminating beam. The detection portion receives circularly polarized backscattered light from moisture in the cloud, in response to the illuminating beam. The circularly polarized backscattered light is passed through a circular polarizer to convert it into linearly polarized backscattered light, which is split into two components. Each of the two components is optionally subject to further linear polarization to filter out any leakage-type orthogonal polarization. The two components are then optically detected and the resulting detection signals are used to calculate one or more parameters reflective of the presence or absence of airborne ice crystals and/or water droplets.

SUMMARY OF THE INVENTION

The present invention relates to the use of polarimetric optical ice detector (OID), a diffractive Supercooled Large Droplet (SLD) detector, and a two-color SLD detector integrated into a single sensor on an aircraft for determining and assessing icing conditions around the aircraft.

In one aspect, an apparatus for detecting icing conditions on an aircraft is described in which an aspect of the invention includes a laser system configured and operative to generate a light signal and direct the light signal into a cloud and a lens component configured and operative to collect echo signals from a cloud caused by the light signal directed into the cloud by the laser system. The apparatus further includes a beam splitter component configured and operative to redirect signals received and passing through the lens component into at least first and second paths. Further provided is a supercooled large droplet (SLD) detector positioned to receive the redirected signals from the beam splitter. The SLD includes a first signal detector component configured and operative to perform a first color measurement on the first redirected signal; and a second signal detector component configured and operative to perform a second color measurement on the second redirected signal wherein the SLD detector is configured and operative to use the first and second color measurements to determine liquid water content and droplet diameter distribution for the cloud into which the light signal was directed by the laser system.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

Figure 1:
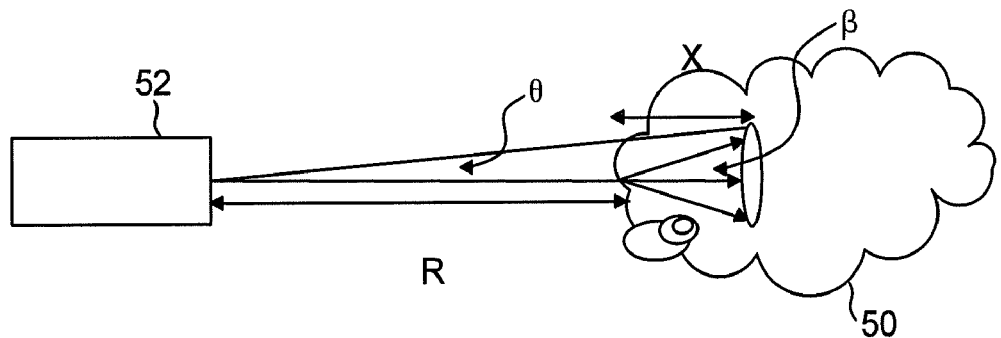
FIG. 1 shows the geometry of multiple scattering in a cloud.
Figure 2:
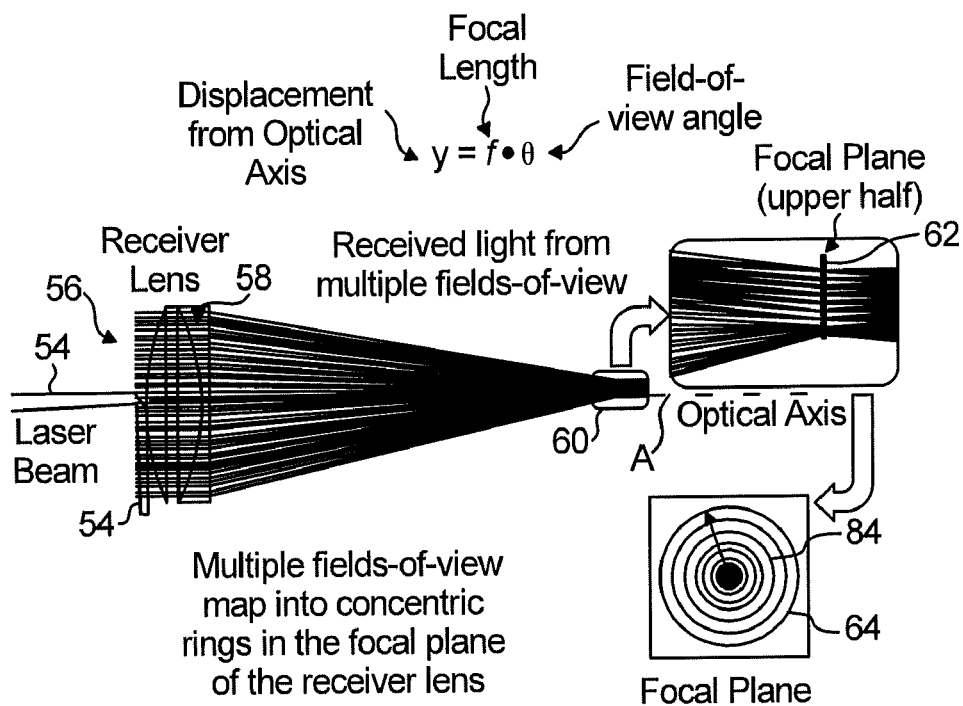
FIG. 2 shows how the multiple fields-of-view generated by droplets map onto a plurality of concentric rings in the focal plane.
Figure 3:
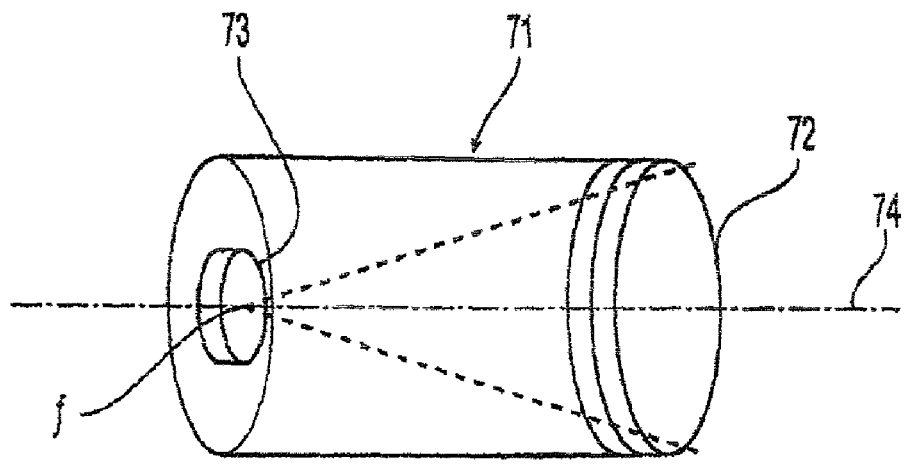
FIG. 3 shows a transparent side view of a prior art multiple field of view detector for detecting atmospheric backscatter, as disclosed in U.S. Pat. No. 5,239,352.
Figure 4:
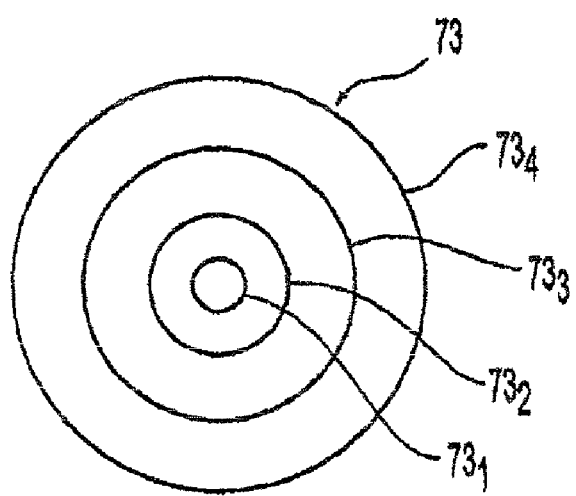
FIG. 4 shows the focal plane of the prior art detector of FIG. 3 showing concentric detector elements.
Figure 5:
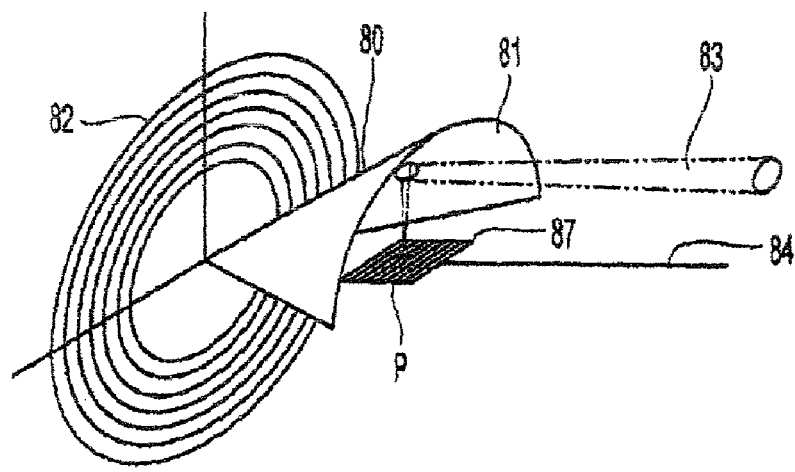
FIG. 5 shows a prior art conical circle-to-line interferometer detector, as disclosed in U.S. Pat. No. 4,893,003.
Figure 6:
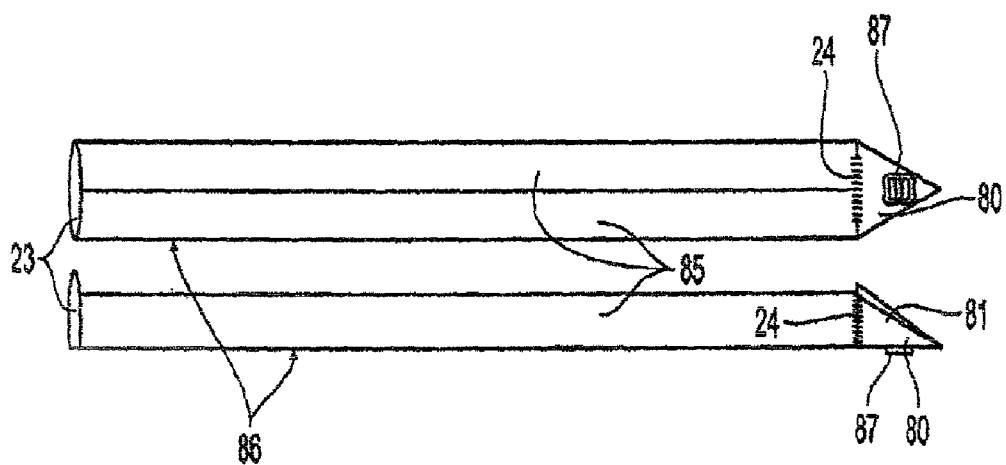
FIG. 6 shows a kaleidoscopic mirror assembly in combination with the detector of FIG. 5.
Figure 7:
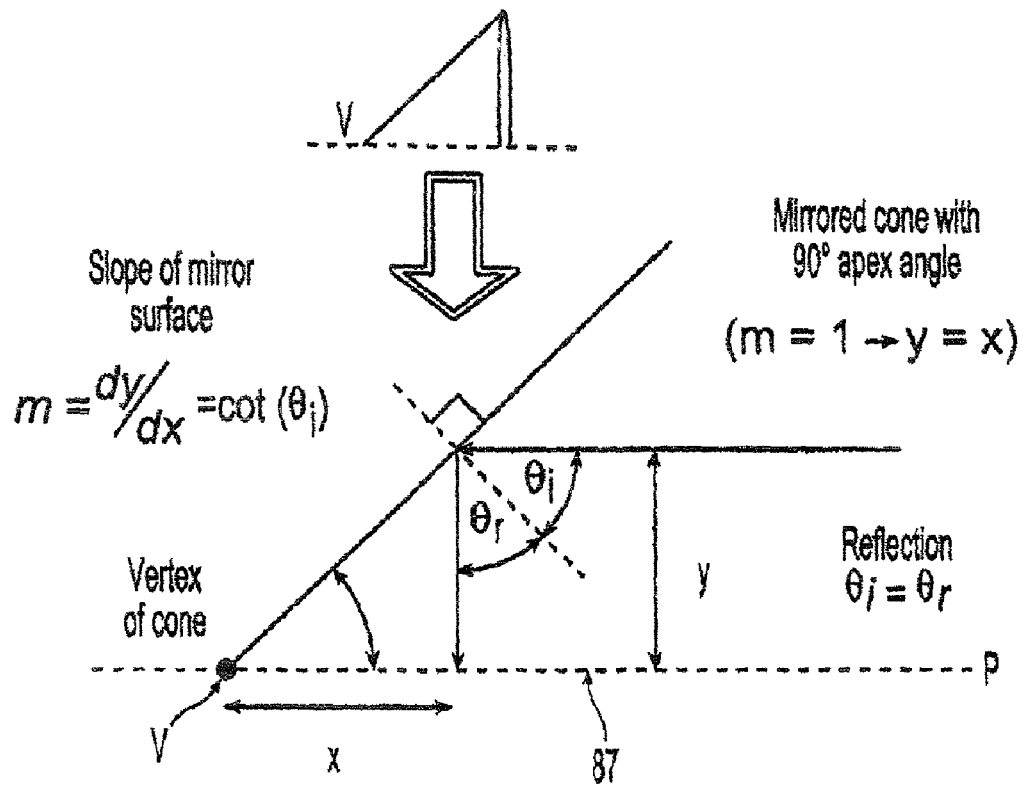
FIG. 7 shows the mapping of an incoming interferometric fringe pattern onto the detector of FIG. 5.

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

The aforementioned U.S. Pat. Nos. 5,239,352 and 4,893,003, along with commonly assigned U.S. Patent Application Nos. 2011/00191188 and 2010/0110431 are incorporated by reference herein, to the extent necessary to understand the invention.

It is to be understood and appreciated an Optical Ice Detector (OID) analyzes circularly polarized light scattered from airborne cloud particles to determine the phase (i.e. water vs. ice). Because the OID uses a pulsed laser, it is operative to determine a cloud's optical extinction coefficient μ. The measured decay of the signal over the depth of the cloud enables the spatial extinction to be calculated due to light scattering. It is further to be appreciated the optical extinction coefficient is important for at least two reasons. First, the optical extinction coefficient relies only on relative signal intensity measurements. After the temporal width of the laser pulse, the bandwidth of the detection electronics, and the geometric form factor of the OID are "de-convolved" from the signal, the remaining waveform is an exponential decay curve, with a decay constant that depends on a cloud's optical extinction coefficient μ. Thus, only the shape of this curve (i.e. the relative magnitudes of temporally consecutive data points) is relevant. The overall magnitude is irrelevant, provided the signal-to-noise ratio is sufficiently high to make a reliable measurement of a cloud's optical extinction coefficient μ. It is noted this is advantageous for an instrument that is intended to be used on an aircraft. It is to be further appreciated and understood complete certainty cannot be provided that the window port on the OID will remain completely clean and have a constant level of optical transmission. Therefore, using relative rather than absolute measurements obviates the need for continuous calibration of the window transmission, a procedure which is extremely difficult to conduct during aircraft flight.

The second reason for measuring optical extinction is that the extinction can be related to the liquid water content (LWC) if the droplet size distribution is known. It is to be understood and appreciated the effective diameter $D_{\mathit{eff}}$ is a weighted average diameter equal to the ratio of the third moment of the droplet number density distribution to its second moment. Therefore, if the droplet diameter distribution is n(D), then:

$$D_{\mathit{eff}} = \frac{\int_0^\infty D^3 n(D) dD}{\int_0^\infty D^2 n(D) dD},$$

where D is the droplet diameter, and n(D) is the droplet number density distribution (with units of $m^{-3}\ \mu m^{-1}$). It is to be understood an advantage of this definition of an average droplet diameter, rather than a simple weighted average of D, is that the numerator is proportional to the LWC, while the denominator is proportional to the optical extinction coefficient. In terms of these parameters, it is to be understood:

$$D_{\mathit{eff}} = \frac{LWC}{3\rho\mu}$$

or $LWC = 3\rho\mu D_{\mathit{eff}}$ where ρ is the density of water ($10^6$ g/m$^3$). It is further noted the optical extinction coefficient assumes that the scattering cross-sectional area of each droplet is twice its geometric cross-sectional area.

It is to be appreciated that for icing conditions, the liquid water content and the distribution of droplet diameters are critical parameters. The optical extinction coefficient, although it can be measured accurately by the OID, is important primarily in relation to LWC and $D_{\mathit{eff}}$. The effective droplet size is estimated by the SLD detector, which determines the relative droplet density distribution. It is to be understood and appreciated, that similar to the OID, the SLD conducts preferably relative measurements.

However, there are situations in which the estimate of $D_{\mathit{eff}}$ by the SLD may not be desirable. This is because the SLD measures the droplet size distribution over a limited droplet size range. Thus, if a significant fraction of the droplets are beyond the maximum size, estimates of $D_{\mathit{eff}}$ and LWC will typically be too low. It is to be understood and appreciated that it is known to those skilled in the art the liquid water content of a cloud can be estimated using a diffractive-scattering droplet sizing technique similar to that employed by the SLD. Their method used the aforementioned equation:

$$D_{\mathit{eff}} = \frac{LWC}{3\rho\mu}$$

or $LWC = 3\rho\mu D_{\mathit{eff}}$ with $D_{\mathit{eff}}$ determined solely from their droplet sizing retrieval technique wherein the upper limit of the technique is less than 200 μm. The LWC estimates are approximately 30% lower than in situ measurements by research aircraft flying through clouds in nearly the same location probed by the laser of the particle-sizing instrument. It is to be appreciated a variety of effects may explain the discrepancy, but it is possible that the droplet size estimate from the diffractive-scattering method is not sensitive to the relatively low number of large droplets that comprise a sizeable fraction of the LWC. It is further to be appreciated this situation is likely to occur for an airborne SLD sensor if an aircraft is flying through large drizzle droplets. It is noted drizzle droplets can be as large as 1000 μm in diameter, which is beyond the 100 to 200 μm limit of a typical SLD. Therefore, a secondary method of determining effective droplet size over a wider droplet size range is desirable to account for such large droplets. The more accurate estimate of effective droplet diameter creates a more accurate estimate of LWC.

It has been proposed by those skilled in the art to use two differing probe laser wavelengths to estimate drizzle drop size and precipitation rate which method is a differential absorption technique that relies on the large difference (nearly 1.000-fold) in the absorption coefficient of liquid water between the two wavelengths. The highly transmitting wavelength is either 905 nm or 1.064 μm, while the absorbed wavelength is 1.5 μm. All of these wavelengths are readily generated by compact solid state lasers that can be incorporated into an airborne icing conditions sensor. It is noted the 1.064-1.5 μm combination is particularly advantageous because a single microchip laser with an optical parametric oscillator produces both wavelengths simultaneously. The ratio of the backscatter at each wavelength corresponds to the MVD of the distribution. Accordingly, it is assumed the droplet distribution is a gamma distribution of the form:

$$n(D) = N_0 \left(\frac{D}{D_0}\right)^m \exp\left(-(3.67+m)\frac{D}{D_0}\right),$$

where $D_0$ is the median volume droplet diameter, and m is a dimensionless parameter controlling the shape of the distribution.

It is further noted those skilled in the art correlate $D_0$ to the "color ratio," the ratio of the backscatter β for the two distinct wavelengths, as shown in the below equation:

$$\text{Color Ratio(dB)} = 10\log_{10}\left(\frac{\beta_{1.064\mu m}}{\beta_{1.5\mu m}}\right)$$

A noted advantage of defining a ratio of backscatter coefficients is that the backscatter ratio is equivalent to the ratio of the received signal strengths at the two wavelengths. Provided the relative intensity of the two transmitted wavelengths is known, the lidar receiver collection geometry and droplet density distribution are the same for both wavelengths. Accordingly, the attenuation difference due to geometric and diffractive scattering is minimal (i.e. less than 2%) between the two wavelengths. It has been noted that the observed difference in backscatter is almost exclusively due to differences in absorption by the total liquid water contained in the droplet distribution.

Figure 8:
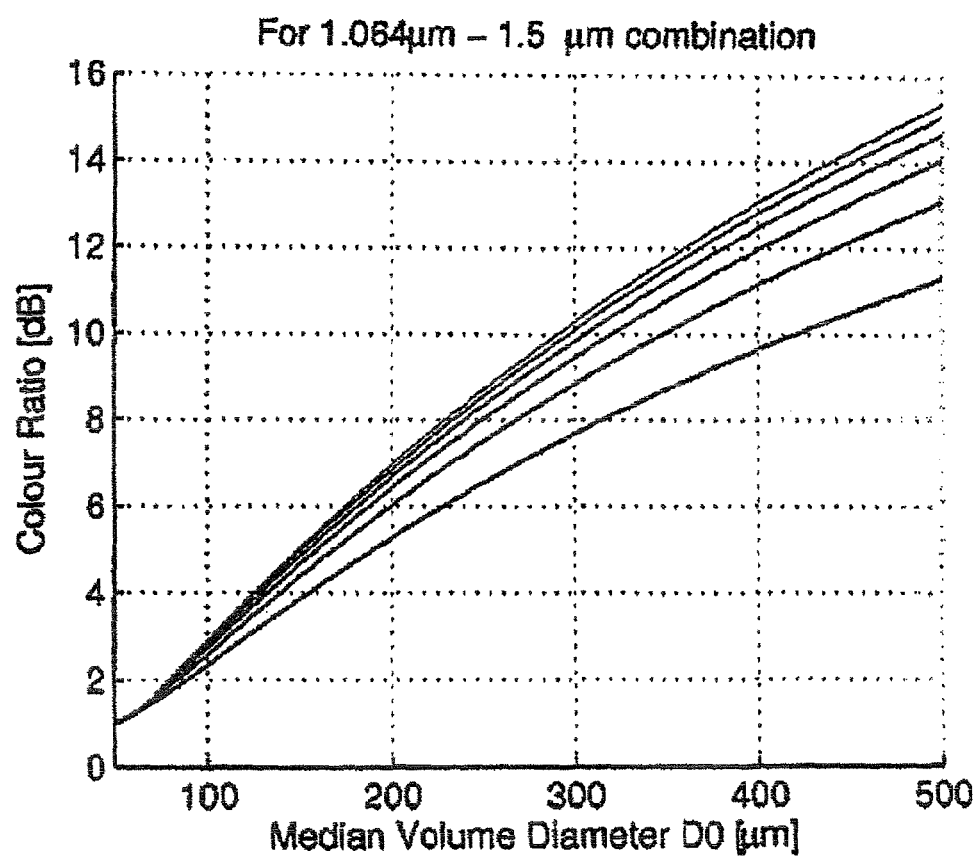
FIG. 8 shows correlation curves for values of m.

It is to be appreciated the color ratio correlates with the MVD of the distribution, but with the shape parameter m unknown, the correspondence is not unique. Thus correlation curves are generated for values of m ranging from 0 to 10 in increments of 2, as shown in FIG. 8. Thus, at any given color ratio, a variety of MVD values are possible. For instance, when the color ratio is ten, the MVD varies from 290 μm to 400 depending on the shape parameter m. It has been noted that the error implicit to the uncertainty of m creates approximately no more than a 20% error in the derived liquid water content.

Figure 9:
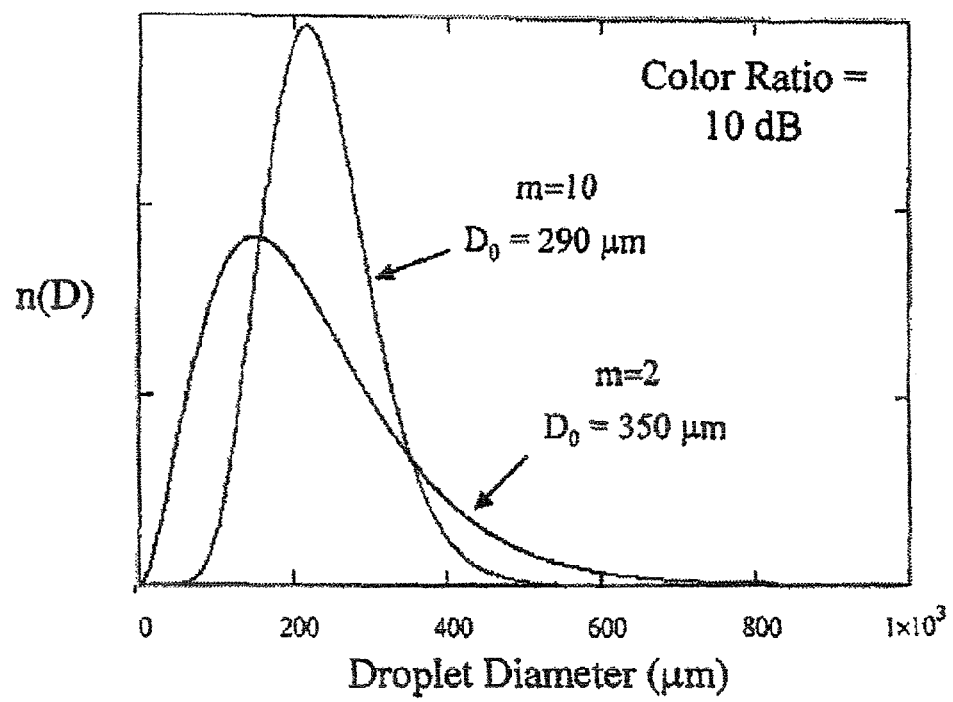
FIG. 9 shows the shape of the droplet distribution changes.

As shown in FIG. 9, the shape of the droplet distribution changes perceptively for the two combinations of m and $D_0$ in which a color ratio of 10 dB permits, in view of the total LWC is approximately the same for both m and $D_0$. It is to be appreciated the difference is especially noticeable for droplet diameters less than 200 μm and although the number density at droplets less than 200 μm changes considerably among the various distributions, these smaller droplets contain less overall liquid water than do the larger droplets.

Thus, despite the relatively low LWC compared to that of the entire distribution, droplets from 20 to 200 μm can be especially dangerous with regard to aircraft icing. When they strike the leading edge of the aircraft wing, they typically roll behind the de-icing devices (such as inflatable pneumatic boots), and freeze onto the control surfaces of the wing. Droplets smaller than 20 μm tend to follow the airstream and bypass the wing, while droplets larger than 200 μm strike the leading edge of the wing and freeze, where they can be removed by standard de-icing systems. Therefore, it is desirable to measure not only the MVD with the two-color technique but also to characterize the shape of the distribution for the small droplet portion of the full size distribution.

In accordance with the invention a two-color measurement of MVD is combined with the droplet size distribution measurement of the SLD detector to provide an accurate measurement of the effective droplet size $D_{\mathit{eff}}$. In the equation:

$$n(D) = N_0\left(\frac{D}{D_0}\right)^m \exp\left(-(3.67+m)\frac{D}{D_0}\right),$$

$D_0$ is determined by the two-color measurement, and the variable m is calculated from the portion of the total droplet distribution profile which is measured by the SLD detector. This is an iterative process involving first the determination of $D_0$, then a fit of the droplet distribution to determine m, and then a new estimate of $D_0$ based on the color ratio and m. The process preferably continues until the droplet distribution calculated by the latest estimates of $D_0$ and m agree with the distribution measured by the SLD to within a prescribed tolerance level.

With the variables m and $D_0$ determined as discussed above, the $D_{\mathit{eff}}$ is computed with the gamma distribution via the aforesaid equation:

$$n(D) = N_0\left(\frac{D}{D_0}\right)^m \exp\left(-(3.67+m)\frac{D}{D_0}\right),$$

Thus, the combination of the two-color measurement and the SLD droplet sizing measurement in conjunction with utilizing an iterative curve-fitting procedure, an enhanced estimate of $D_{\mathit{eff}}$ is provided than either above mentioned technique could provide alone. The accurate estimate of $D_{\mathit{eff}}$ and the extinction coefficient measurement from the OID enables LWC to be compute accurately from the smallest droplet limit of the SLD (typically about 2 to 5 μm) to at least 500 μm. It is to be appreciated and understood all of the parameters that are needed (two-color backscatter ratio, extinction coefficient, droplet size distribution from 2 μm to 200 μm) are derived from relative measurements. That is, none of them require absolute, calibrated measurements of signal peak heights or backscatter coefficients. Preferably only numerical ratios or the general shape of a droplet distribution are needed.

It is noted that it has been proposed by those skilled in the art to use the two-color method to derive LWC, but this technique is disadvantageous in that it requires a measurement of the backscatter at one of the laser wavelengths wherein an accurate backscatter measurement requires calibration of the lidar and, for an in-flight sensor, a correction for the transmission of the window viewing port that is mounted onto the skin of the aircraft. In contrast, the present invention utilizes the measured extinction coefficient rather than the backscatter at a single wavelength to compute LWC.

Figure 10:
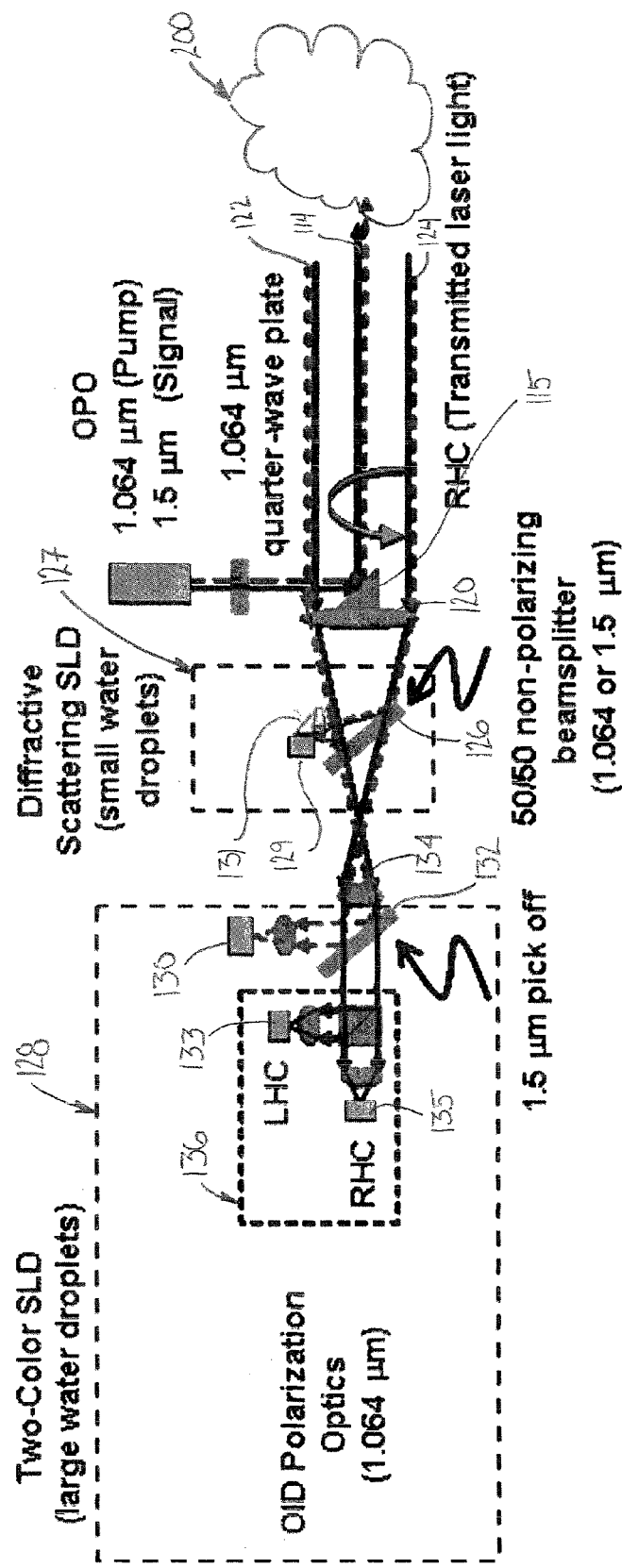
FIG. 10 shows a schematic of an apparatus in accordance with an illustrated embodiment of the invention.

With reference now to FIG. 10, shown is a two-color OID and SLD apparatus, referenced generally by numeral 100, configured and operative for in-flight detection of icing conditions in accordance with an illustrated embodiment of the invention. Apparatus 100 includes a laser component 110 which in the illustrated embodiment is preferably a pulsed 1.064 μm microchip that pumps an optical parametric oscillator (OPO) crystal 112 configured and is operative to preferably generate a 1.5 μm "signal" light through parametric down conversion. It is to be appreciated the aforesaid generated signal is not to be understood to be limited to 1.5 or 1.064 μm signal but rather may encompass any wavelength suitable for use with the invention (for instance, two pulsed diode laser may be employed with one operating at 905 nm and the other at 1550 nm) and reference hereinafter to a 1.5 or 1.064 μm signal is only for descriptive purposes of the illustrated embodiment.

It is noted, in the illustrated embodiment, an "idler" frequency at 3.7 μm may also created, which can be filtered optically from the 1.5 μm signal beam 114. Preferably, both the pump 112 and the signal 114 are linearly polarized and exit the laser 110 together. Preferably, a quarter-wave plate 116 converts the linearly polarized light at 1.064 μm into circularly polarized light (via preferably right-hand circularly (RHC) polarized), which light signal 114 is transmitted into a cloud 200, preferably via a deflector component 115. It is to be understood and appreciated the light at 1.5 μm remains in its original linear polarization state since it is not analyzed to determine the cloud phase.

A single lens 120 preferably collects the echo signals from the first and second wavelengths 122, 124 refracting from the cloud 200. Apparatus 100 further preferably includes a wavelength-specific beam splitter 126 configured and operative to direct half of the light at either 1.064 or 1.5 µm into a SLD diffractive scattering droplet size detector 127 while passing the remaining light to the two-color SLD detector 128. It is to be understood and appreciated, either aforesaid wavelength conveys droplet size information. It is noted the longer wavelength creates larger scattering angles that improve the resolution of large droplets.

Preferably the SLD droplet size detector 127 includes a linear array detector 129 and a reflective cone component 131. The aforesaid wavelength-specific beam splitter 126 directs light into the linear array detector 129 via the reflective cone component 131.

With regards to the two-color SLD detector 128, in accordance with the illustrated embodiment, it preferably includes single element detectors represented as near-infrared photo-detector components 130, 133 and 135, such as an InGaAs detector. It is to be understood reference hereinafter to a InGaAs detector is only for descriptive purposes of the illustrated embodiment as any suitable near-infrared photodetector component may be used. It is also to be appreciated and understood the received echo at 1.5 µm is also likely to be weaker than that at 1.064 µm due to increased absorption by liquid water.

In the illustrated embodiment of FIG. 10 a second dichroic mirror 132 is positioned behind a collimating lens 134 configured and operative to remove the remaining 1.5 µm light and direct the light signal it into the InGaAs photodetector 130. The 1.064 µm light preferably passes into the polarization optics of a polarimetric OID receiver 136 which includes single element detectors 133 and 135. Thus, the signal detected by the single element photodetector 130 is a first color measurement, while the summation of the signals produced by the combination of RHC and LHC light (single element detectors 133 and 135) forms the second color measurement. Calibration of the relative sensitivities of the channels is necessary to achieve an accurate color ratio, but the calibration occurs only once during the manufacture of the sensor. It does not need to be repeated during use of the instrument on-board the aircraft Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

The above presents a description of a best mode contemplated for carrying out the present invention apparatus and method for detecting aircraft icing conditions, and of the manner and process of making and using them, in such full, clear, concise, and exact terms as to enable any person skilled in the art to which it pertains to make and use these devices and methods. The present invention apparatus and method for detecting aircraft icing conditions is, however, susceptible to modifications and alternative method steps from those discussed above that are fully equivalent. Consequently, the present invention apparatus and method for detecting aircraft icing conditions is not limited to the particular embodiments disclosed. On the contrary, the present invention apparatus and method for detecting aircraft icing conditions encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. An air-borne apparatus for detecting icing conditions, the apparatus comprising:
    a laser system configured and operative to generate a light signal and direct the light signal into a cloud;
    a lens component configured and operative to collect echo signals from a cloud caused by the light signal directed into the cloud by the laser system;
    a beam splitter component configured and operative to redirect signals received and passing through the lens component into at least first and second paths;
    a supercooled large droplet (SLD) detector positioned to receive the redirected signals from the beam splitter, the SLD detector including:
        a first signal detector component configured and operative to perform a first color measurement on the first redirected signal; and
        a second signal detector component configured and operative to perform a second color measurement on the second redirected signal wherein the SLD detector is configured and operative to use the first and second color measurements to determine liquid water content and droplet diameter distribution for the cloud in which the light signal was directed into by the laser system.

2. An apparatus as recited in claim 1, wherein the liquid water content and the droplet diameter distribution for a cloud are estimated from 1 µm to 500 µm by the SLD detector.

3. An apparatus as recited in claim 1, wherein the first signal detector component is a near-infrared detector.

4. An apparatus as recited in claim 1, wherein the near-infrared detector receives a 1.5 µm signal.

5. An apparatus as recited in claim 1, wherein the second signal detector component is an optical ice detector (OID).

6. An apparatus as recited in claim 5, the OID includes polarization optics.

7. An apparatus as recited in claim 6, wherein the OID receives a 1.064 µm signal.

8. An apparatus as recited in claim 1, wherein the apparatus is configured for use on an aircraft for detecting icing conditions around an aircraft.

9. An apparatus as recited in claim 1 wherein the laser system is configured and operative to generate a 1.5 µm signal.

10. An apparatus as recited in claim 1 wherein the laser system includes a pulsed 1.064 µm microchip operative to pump an optical parametric oscillator to generate a 1.5 µm signal.

11. An apparatus as recited in claim 10 wherein the 1.064 μm microchip is operative and configured to perform a parametric down conversion on a generated signal to generate the 1.5 μm signal.

12. An apparatus as recited in claim 10 wherein both the 1.064 μm microchip and generated signal linearly polarized exit the laser system together.

13. An apparatus as recited in claim 12 further including a quarter wave plate configured to perform the circular polarization.

14. An apparatus as recited in claim 1 wherein the beam splitter is configured and operative to direct at least a portion of the received signal from the lens component at one of 1.064 μm or 1.5 μm into the SLD detector.

15. An apparatus as recited in claim 14 further including a dichroic mirror and collimating lens positioned intermediate the beam splitter and the SLD detector.

16. An apparatus as recited in claim 1 wherein the SLD detector includes a diffractive scattering SLD having an internally reflective cone configured and operative to determine water droplet size.

17. An apparatus as recited in claim 1 wherein the laser system includes at least one pulsed diode laser.

* * * * *